Jan. 14, 1969  R. L. GOLDEN  3,421,732
FLUIDIC CONTROLLED WATER VALVE OR THE LIKE
Filed May 26, 1966  Sheet 1 of 2

INVENTOR,
ROBERT L. GOLDEN

BY

HIS ATTORNEYS

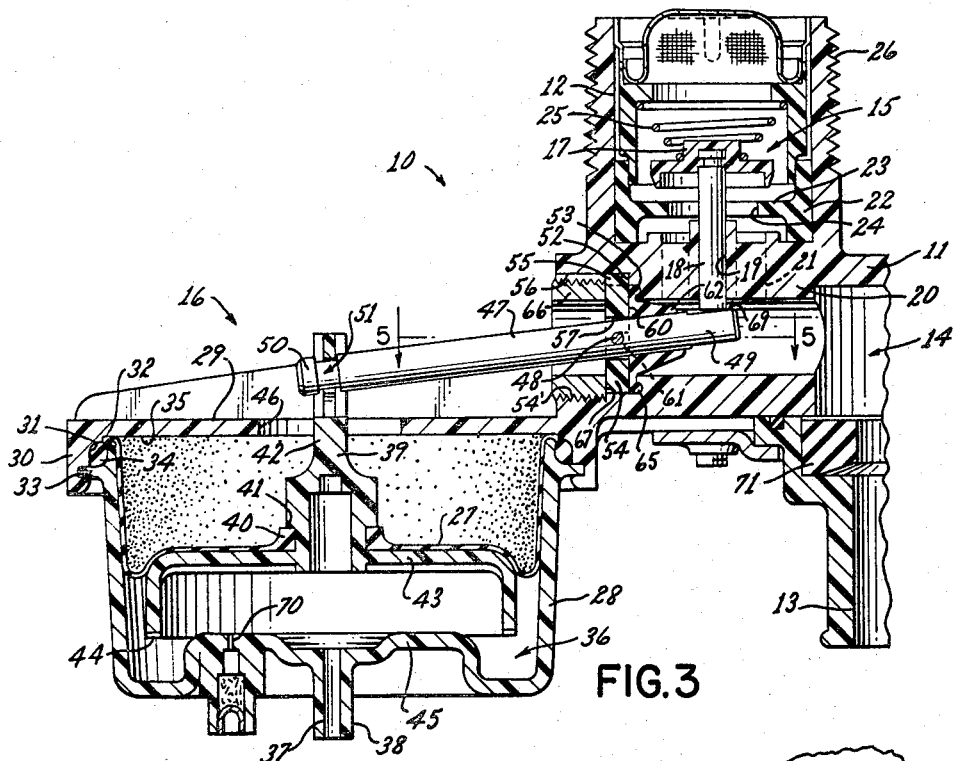
FIG.3
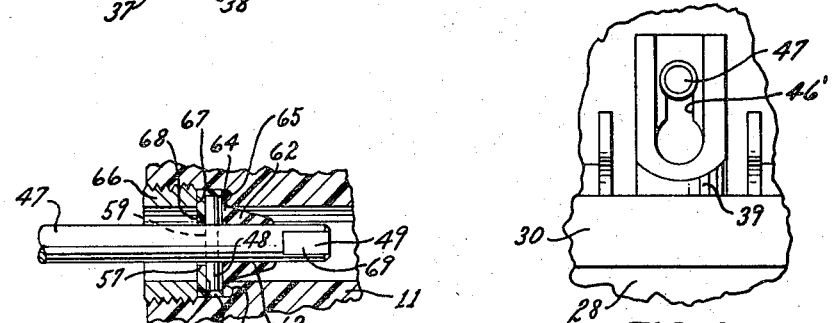
FIG.5
FIG.4
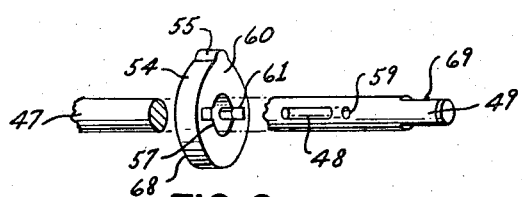
FIG.6
INVENTOR,
ROBERT L. GOLDEN
BY
HIS ATTORNEYS

United States Patent Office 3,421,732
Patented Jan. 14, 1969

3,421,732
FLUIDIC CONTROLLED WATER VALVE OR THE LIKE
Robert L. Golden, Greensburg, Pa., assignor to Robertshaw Controls Company, Richmond, Va., a corporation of Delaware
Filed May 26, 1966, Ser. No. 553,107
U.S. Cl. 251—58                                         8 Claims
Int. Cl. F16k *31/145;* F01b *19/02;* F16k *31/44*

ABSTRACT OF THE DISCLOSURE

This disclosure relates to a water mixing valve wherein the valve members in the inlets thereof are moved between their opened and closed positions by rocker arms pivotally mounted to the housing means and being interconnected to pneumatically operated actuators mounted in contilevered fashion to outwardly extending platform means and having rolling diaphragms to compensate for warpage of the platform means, the rocker arms each carrying a pivot pin pivotally mounted in a sealing disc construction.

---

This invention relates to an improved water valve or the like as well as to improved parts for such a water valve or the like.

It is well known that various fluidic controlled water mixing valves and the like have been provided for controlling the flow of hot and cold water into a domestic appliance, such as an automatic clothes washing machine or the like.

However, such prior known fluidic operated water mixing valves and the like not only had leakage problems in the fluidic actuators thereof, but also such prior known fluidic controlled water mixing valves did not have means for compensating for warpage thereof during relatively long periods of use thereof.

However, according to the teachings of this invention, an improved water valve or the like is provided wherein the above problems and others have been substantially eliminated while the overall cost of the water mixing valve of this invention is relatively low.

Accordingly, it is an object of this invention to provide an improved water valve or the like having one or more of the novel features set forth above or hereinafter shown or described.

Another object of this invention is to provide improved parts for such a water valve or the like, the improved parts of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 3 is a view similar to FIGURE 2 and illustrates the left-hand valve member in its opened position.

FIGURE 4 is a fragmentary end view of the structure illustrated in FIGURE 3.

FIGURE 5 is a fragmentary cross-sectional view taken on line 5—5 of FIGURE 3.

FIGURE 6 is an exploded perspective view of the rocker arm pivot means for the structure illustrated in FIGURE 3.

Figure 1:
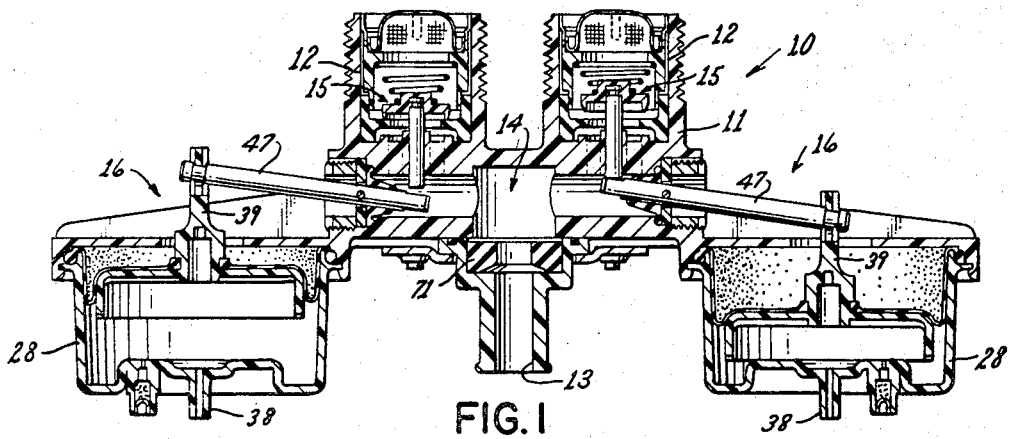
FIGURE 1 is a cross-sectional view illustrating an improved water mixing valve of this invention.

While the various features of this invention are hereinafter described and illustrated as being particularly adapted for forming a water valve or the like, it is to be understood that the various features of this invention can be utilized to provide other types of valve mechanisms as desired.

Therefore, this invention is not to be limited to only the embodiments illustrated in the drawings, because the drawings are merely utilized to illustrate one of the wide variety of uses of this invention.

Referring now to FIGURE 1, the improved water mixing valve of this invention is generally indicated by the reference numeral 10 and comprises a housing means 11 having a pair of like inlet bores 12 and an outlet bore 13 fluidly interconnected to the inlet bores 12 by passage means 14 formed in the housing 11 in a manner hereinafter described.

A valve means 15 is disposed in each inlet 12 and is controlled by a fluidic actuator 16 in a manner hereinafter described.

Since each valve means 15 and its associated actuator 16 is identical to the other, only the particular details of the left-hand valve means 15 and its associated actuator 16 will now be described with the understanding that such description also applies to the right-hand valve means 15 and its associated valve actuator 16.

Figure 2:
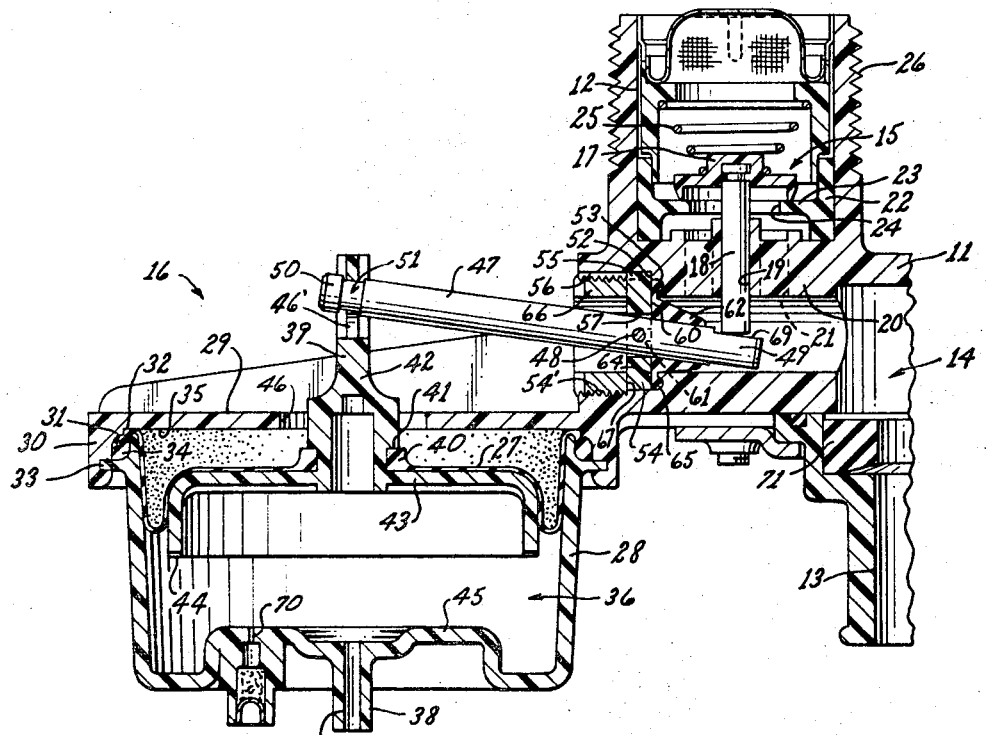
FIGURE 2 is an enlarged, fragmentary view of the left-hand portion of the mixing valve of FIGURE 1.

As illustrated in FIGURES 2 and 3, the valve means 15 includes a valve member 17 carrying a valve stem 18 guided within a guide bore 19 passing through a shoulder means 20 of the housing means 11, the shoulder means 20 separating the passage means 14 from the inlet 12 but being fluidly interconnected thereto by suitable aperture means 21 passing through the shoulder means 20.

A valve seat member 22 is disposed in the respective inlet bore 12 and has an inwardly directed annular flange 23 provided with a passage means 24 passing therethrough. The valve member 17 is normally urged to its closed position against the annular flange 23 of the valve seat member 22 by a compression spring 25 whereby the valve member 17 closes the passage 24 of the valve seat member 22 from the inlet 12, the inlet 12 being adapted to be fluidly interconnected to a hot or cold water supply conduit by means of a coupling member coupling the water supply conduit to the external threads 26 on the housing 11 in a conventional manner.

The fluidic actuator 16 is formed by a flexible rolling diaphragm 27 and cup-shaped member 28 secured to a cantilevered platform means 29 of the housing 11 in a manner now to be described.

The platform means 29 has a downwardly extending flange 30 provided with stepped annular recess means 31 in the interior surface thereof.

The cup-shaped member 28 has an upper open end 32 and an outwardly directed annular rib 33 disposed spaced from the end 32 thereof, the rib 33 being so constructed and arranged that the same is adapted to be snap fitted in the lower portion of the stepped recess means 31 of the platform means 29 to interconnect the cup-shaped member 28 thereto.

The flexible diaphragm 27 has an annular bead 34 on the outer periphery thereof that is adapted to be disposed and compressed in the upper portion of the stepped recess 31 of the platform means 29 when the cup-shaped member 28 is snap fitted thereto in the manner illustrated in FIGURE 2, the open end 32 and rib 33 on the cup-shaped member 28 being so constructed and arranged that when the same is snap fitted to the platform means 29 of the housing means 11, not only does the cup-shaped member 28 sealingly compress the annular bead 31 of the diaphragm 27 against the platform means 29, but also the end 32 thereof compresses the diaphragm 27 against the under surface 35 of the platform means 29 whereby positive fluid sealing is effected between the outer periphery of the diaphragm 27 and the cup-shaped member 28.

In this manner, a chamber 36 is defined between the flexible diaphragm 27 and the cup-shaped member 28, the chamber 36 being adapted to be interconnected to a vacuum source by a passage means 37 formed in a conduit nipple means 38.

An actuating post means 39 is provided and sealingly receives a thickened inner periphery 40 of the diaphragm 27 in an annular recess 41 thereof formed between a post portion 42 and a diaphragm back-up means 43 thereof whereby the diaphragm 27 is fluidly sealed and carried by the post means 39.

The back-up portion 43 of the post means 39 is substantially cup-shaped with the open end 44 thereof facing toward the closed end 45 of the cup-shaped member 28.

The back-up portion 43 of the post means 39 and cup-shaped member 28 are so constructed and arranged that the same causes the diaphragm 27 to substantially roll as the diaphragm 27 is moved between its deactuated position of FIGURE 2 and its actuated position of FIGURE 3 in a manner hereinafter described.

The post portion 42 of the post means 39 projects through an opening 46 in the platform means 29 of the housing means 11 and has a substantially inverted keyhole shaped slots 46′, FIGURE 4, passing therethrough. In this manner, a rocker arm 47 can be pivotally mounted to the housing means 11 by a pivot pin means 48 in a manner hereinafter described intermediate its opposed ends 49 and 50, and the end 50 of the arm 47 having an annular recess 51 formed therein to interconnect the same to the post portion 42 of the post means 39 in the manner illustrated in FIGURE 2 and 4.

The passage means 14 in the housing means 11 is so constructed and arranged that the same defines a housing shoulder 52 having an annular recess 53 therein, the passage means 14 being internally threaded at 54′ for a purpose hereinafter described.

A pivot disc 54 is provided and is substantially circular except for an outwardly directed positioning tab 55 which is adapted to be received in a cooperating positioning groove 56 in the housing means 11 whereby rotational orientation of the pivot disc 54 relative to the housing 11 is positively maintained when the pivot disc 54 is received in the passage means 14 outboard of the shoulder 52 in the manner illustrated in FIGURES 2, 3 and 5.

The pivot disc 54 has an aperture 57 passing therethrough to loosely receive the rocker arm 47 so that the rocker arm 47 can pivot relative thereto, the rocker arm 47 carrying a pivot pin 58 in a bore 59 passing transversely therethrough. The side 60 of the pivot disc 54 is interrupted by slot means 61 on diametric opposed sides of the aperture 57 whereby the projecting ends of the pivot pin 68 can be received in the slot means 61 in the manner illustrated in FIGURE 5 to pivotally mount the rocker arm 47 to the pivot disc 54 and, thus, to the housing means 11.

A substantially thimble-shaped resilient sealing member 62 is provided and has an aperture 63 passing therethrough to snugly receive the rocker arm 47 in the manner illustrated in FIGURE 5, the sealing member 62 having a disc shaped end 64 to be compacted between the pivot disc 54 and the shoulder means 52 of the housing 11 while an annular bead 65 thereof is received in the annular recess 53 of the shoulder means 52.

In order to compact the sealing member 65 and pivot disc 54 in assembled relation against the shoulder means 52 of the housing 11, a cylindrical retainer 66 is threaded into the passage means 11 and has an end 67 adapted to engage the other side 68 of the pivot disc 54 and compact the same against the disc portion 64 of the sealing member 62 and place the disc portion 64 of the sealing member 62 into sealing relationship with the shoulder 52 of the housing 11 whereby the left hand end of the passage means 14 is fluidly sealed from the exterior of the housing 11 while permitting the end 49 of the rocker arm 47 to project into the same.

Thus, it can be seen that the disc-like portion 64 of the sealing member 62 holds the pivot pin 48 of the rocker arm 47 in the slot means 61 of the pivot disc 54 to permit the rocker arm 67 to pivot relative to the disc member 54 in a manner hereinafter set forth.

The rocker arm 47 is provided with a flat surface 69 on the end 49 thereof with the flat surface 69 being engageable with the stem 18 of its respective valve member 17.

Thus, it can be seen that the various parts of the water mixing valve 10 of this invention can be formed in a relatively simple manner and can be assembled together without complicated fastening means or complicated procedures whereby the overall cost of the improved water mixing valve 10 of this invention is relatively small.

The operation of the water mixing valve 10 will now be described. However, only the operation of the left hand valve means 15 and its associated actuator 16 will be described with the understanding that such operation is identical for the right hand valve means 15 and its associated actuator 16.

When the actuator 16 has its chamber 36 interconnected to the atmosphere, such as by having the passage means 37 thereof interconnected to the atmosphere or by having an orifice 70 formed in the closed end 35 of the cup-shaped member 28 interconnecting the atmosphere to the chamber 36, the force of the compression spring 25 as well as the force of the head of the water being interconnected to the inlet 12 by a suitable supply conduit causes the valve member 17 to fully seat against the flange 23 of the valve seat member 22 to close the passage 24 thereof while pivoting the rocker arm 47 to the deactuated position illustrated in FIGURE 2.

However, when a vacuum is imposed in the chamber 36, the flexible diaphragm 27 is pulled downwardly from the position illustrated in FIGURE 2 to the position illustrated in FIGURE 3 to cause the rocker arm 47 to pivot in a counterclockwise direction so that upward movement of the end 49 of the rocker arm 47 moves the valve stem 18 vertically upwardly to carry the valve member 17 away from the valve seat member 22 to open the passage 24. In this manner, the flow of water into the inlet 12 can now pass through the opening valve seat member 22 into the passage means 14 and be directed out of the outlet 13 for the desired purpose, the outlet 13 having a flow control washer means 71 disposed therein as desired.

As illustrated in FIGURE 3, it can be seen that when the valve member 17 is moved to its fully opened position by the rocker arm 47, the end 44 of the back-up plate portion 43 of the post means 39 is still spaced from the closed end 45 of the cup-shaped member 28 whereby should subsequent warpage of the platform means 29 occur through repeated heating thereof by the hot water passing through the mixing valve 10, the stroke of the rolling diaphragm 27 can be increased a substantial amount to compensate for such warpage.

Thus, the valve member 17 can still be moved to its fully opened position even though the platform means 29 has warped and bowed downwardly. In this manner reinforcing metal plates and the like are not required to prevent warpage of the platform means 29 as in prior known water mixing valves and the like.

When the vacuum source is disconnected from the chamber 36 and the atmosphere is permitted to return to the chamber 36 in any of the manners previously described, the force of the compression spring 25 and head of water in the inlet 12 causes the valve member 17 to move to its closed position and cause the rocker arm 47 to pivot in a clockwise direction back to the position illustrated in FIGURE 2.

Accordingly, it can be seen that the various features of this invention not only permit the rocker arm 47 to be pivoted to the housing 11 in a simple and effective manner, but also the features of this invention provide improved actuator means 16 therefore to not only compensate for warpage of the housing 11, but also to positively fluid seal the diaphragm 27 and cup-shaped member 28 together.

Thus, not only does this invention provide an improved water valve or the like, but also this invention provides improved parts for such a water valve or the like.

While the form of the invention now preferred has been disclosed as required by the statutes, other forms may be used, all coming within the scope of the claims which follow.

What is claimed is:

1. A water valve or the like comprising a housing means having an inlet interconnected to an outlet by a valve seat means to provide a flow passage through said housing means, a valve member for opening and closing said valve seat means, pneumatically operated actuator means carried by said housing means for moving said valve member relative to said valve seat means, said actuator including a flexible rolling diaphragm operatively interconnected to said valve member, a rocker arm pivotally mounted to said housing means intermediate the opposed ends of said arm to operatively interconnect said actuator to said valve member, said housing means having a bore interconnecting the exterior of said housing means to said flow passage, said rocker arm being pivotally mounted in said bore, a disc telescoped in said bore, said disc having an aperture passing therethrough and receiving said arm, and a pivot pin carried by said arm and pivotally mounting said arm to said disc.

2. A water valve or the like as set forth in claim 1 wherein said disc has slot means in one side thereof, said pin being received in said slot means to pivotally mount said rocker arm to said disc.

3. A water valve or the like as set forth in claim 2 and including a thimble-like sealing member receiving said rocker arm and disposed in said bore, said sealing member being disposed in said bore intermediate said disc and said housing means to seal said bore from said flow passage.

4. A water valve or the like as set forth in claim 3 and including retainer means disposed in said bore outboard of said disc to compact said disc and sealing member in stacked relation against said housing means.

5. A water valve or the like comprising a housing means having an inlet interconnected to an outlet by a valve seat means to provide a flow passage through said housing means, a valve member for opening and closing said valve seat means, and pneumatically operated actuator means carried by said housing means for moving said valve member relative to said valve seat means, said actuator being operatively interconnected to said valve member, a rocker arm pivotally mounted to said housing means intermediate the opposed ends of said arm to operatively interconnect said actuator to said valve member, said housing means having a bore interconnecting the exterior of said housing means to said flow passage, said rocker arm being pivotally mounted in said bore, a disc telescoped in said bore, said disc having an aperture passing therethrough and receiving said arm, and a pivot pin carried by said arm and pivotally mounting said arm to said disc.

6. A water valve or the like as set forth in claim 5 wherein said disc has slot means in one side thereof, said pin being received in said slot means to pivotally mount said rocker arm to said disc.

7. A water valve or the like as set forth in claim 6 and including a thimble-like sealing member receiving said rocker arm and disposed in said bore, said sealing member being disposed in said bore intermediate said disc and said housing means to seal said bore from said flow passage.

8. A water valve or the like as set forth in claim 7 and including retainer means disposed in said bore outboard of said disc to compact said disc and sealing member in stacked relation against said housing means.

References Cited
UNITED STATES PATENTS

| 1,941,831 | 1/1934 | Ford | 137—505.47 X |
| 2,641,871 | 6/1953 | Ray | 251—58 X |
| 2,759,075 | 8/1956 | Hults | 74—18.1 X |
| 3,032,056 | 5/1962 | Riley et al. | 137—505.47 X |
| 3,208,394 | 9/1965 | Taplin | 74—18.1 X |
| 3,250,295 | 5/1966 | Palmer et al. | 137—606 |
| 3,294,030 | 12/1966 | Fox | 92—98 X |
| 3,334,545 | 8/1967 | Houser | 92—99 X |

ARNOLD ROSENTHAL, *Primary Examiner.*

U.S. Cl. X.R.

251—61, 235; 92—98, 99